(12) United States Patent
Hashiguchi et al.

(10) Patent No.: US 10,248,888 B2
(45) Date of Patent: Apr. 2, 2019

(54) CLASSIFYING METHOD, STORAGE MEDIUM, INSPECTION METHOD, AND INSPECTION APPARATUS

(71) Applicant: CANON KABUSHIKI KAISHA, Tokyo (JP)

(72) Inventors: Hidenori Hashiguchi, Utsunomiya (JP); Hiroshi Okuda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/943,512

(22) Filed: Nov. 17, 2015

(65) Prior Publication Data
US 2016/0155026 A1    Jun. 2, 2016

(30) Foreign Application Priority Data

Nov. 28, 2014  (JP) ................................. 2014-242305
Oct. 7, 2015    (JP) ................................. 2015-199722

(51) Int. Cl.
*G06K 9/62*   (2006.01)
*G06T 7/00*   (2017.01)

(52) U.S. Cl.
CPC ......... *G06K 9/6255* (2013.01); *G06K 9/6267* (2013.01); *G06T 7/001* (2013.01); *G06T 2207/20081* (2013.01)

(58) Field of Classification Search
None
See application file for complete search history.

(56) References Cited

U.S. PATENT DOCUMENTS 8,189,906 B2   5/2012   Fujimori et al.
8,625,906 B2   1/2014   Isomae et al.
(Continued)

FOREIGN PATENT DOCUMENTS

CN   1828632 A       9/2006
CN   101794392 A    8/2010
(Continued)

OTHER PUBLICATIONS

Office Action issued in U.S. Appl. No. 14/945,780 dated Jun. 19, 2017.
(Continued)

*Primary Examiner* — Bernard Krasnic
(74) *Attorney, Agent, or Firm* — Rossi, Kimms & McDowell LLP

(57) ABSTRACT

The present invention provides a classifying method of classifying an article into one of a plurality of groups based on an image of the article, comprising determining an evaluation method for obtaining an evaluation value of an image by using at least some of sample images, obtaining evaluation values for the sample images by the determined evaluation method, changing a group to which a sample of at least one sample image having a singular evaluation value among the sample images belongs, changing the evaluation method using the sample images after changing the group to which the sample of the at least one sample image belongs, obtaining an evaluation value for the image of the article using the changed evaluation method, and classifying the article into one of the plurality of groups based on the evaluation value for the image of the article.

24 Claims, 7 Drawing Sheets

(56) References Cited

U.S. PATENT DOCUMENTS

| | | | | |
|---|---|---|---|---|
| 2008/0273761 | A1* | 11/2008 | Kawata | G06K 9/00281 |
| | | | | 382/115 |
| 2009/0222753 | A1* | 9/2009 | Yamaguchi | G06T 7/0004 |
| | | | | 715/771 |
| 2010/0086176 | A1* | 4/2010 | Yokono | G06K 9/00369 |
| | | | | 382/103 |
| 2010/0177957 | A1* | 7/2010 | Ogawa | G06K 9/00248 |
| | | | | 382/160 |
| 2016/0155023 | A1* | 6/2016 | Uemura | G06K 9/4614 |
| | | | | 382/224 |

FOREIGN PATENT DOCUMENTS

| | | |
|---|---|---|
| CN | 102165488 A | 8/2011 |
| JP | 2010102690 A | 5/2010 |
| JP | 2010157154 A | 7/2010 |

OTHER PUBLICATIONS

Notice of Allowance issued in U.S. Appl. No. 14/945,780 dated Jan. 4, 2018.

Office Action issued in Chinese Appln. No. 201510847745.6 dated Jun. 22, 2018.

\* cited by examiner

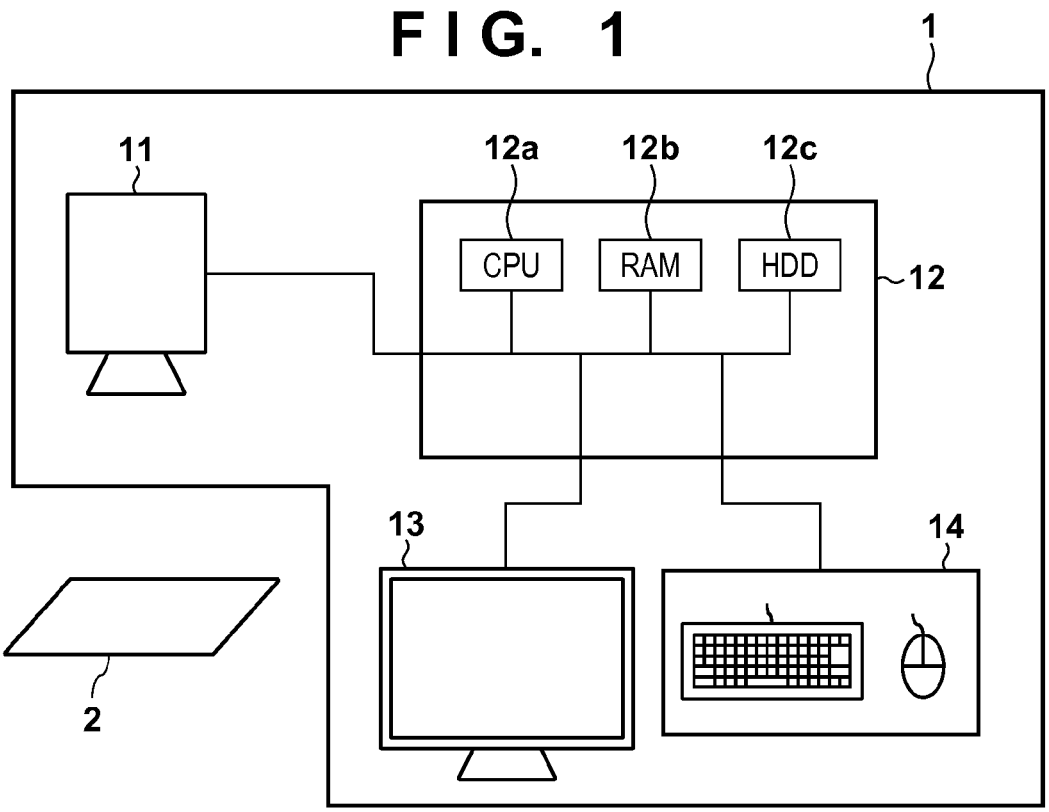
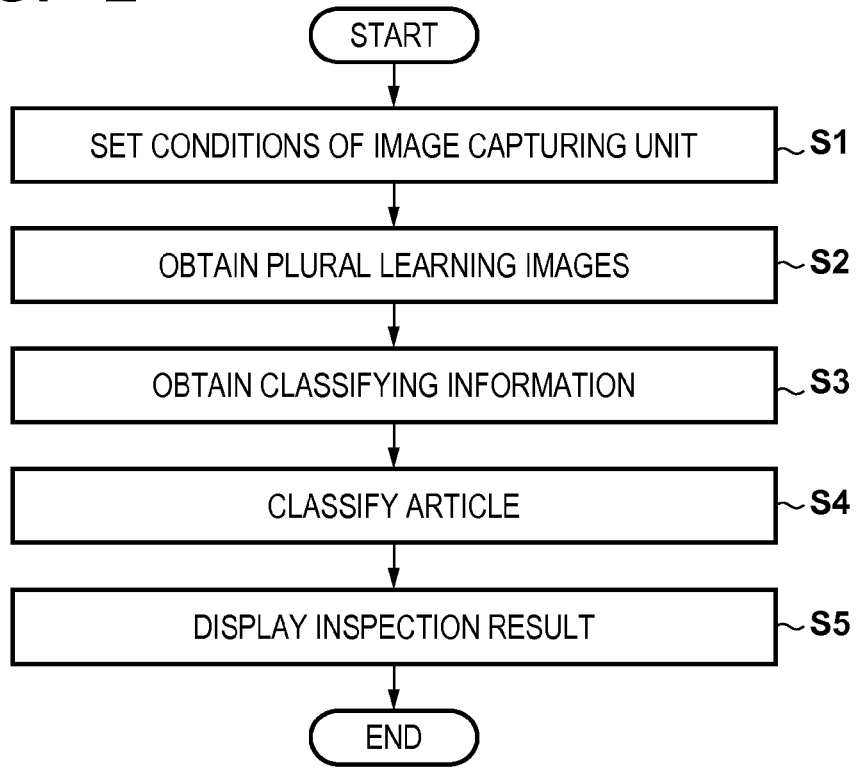

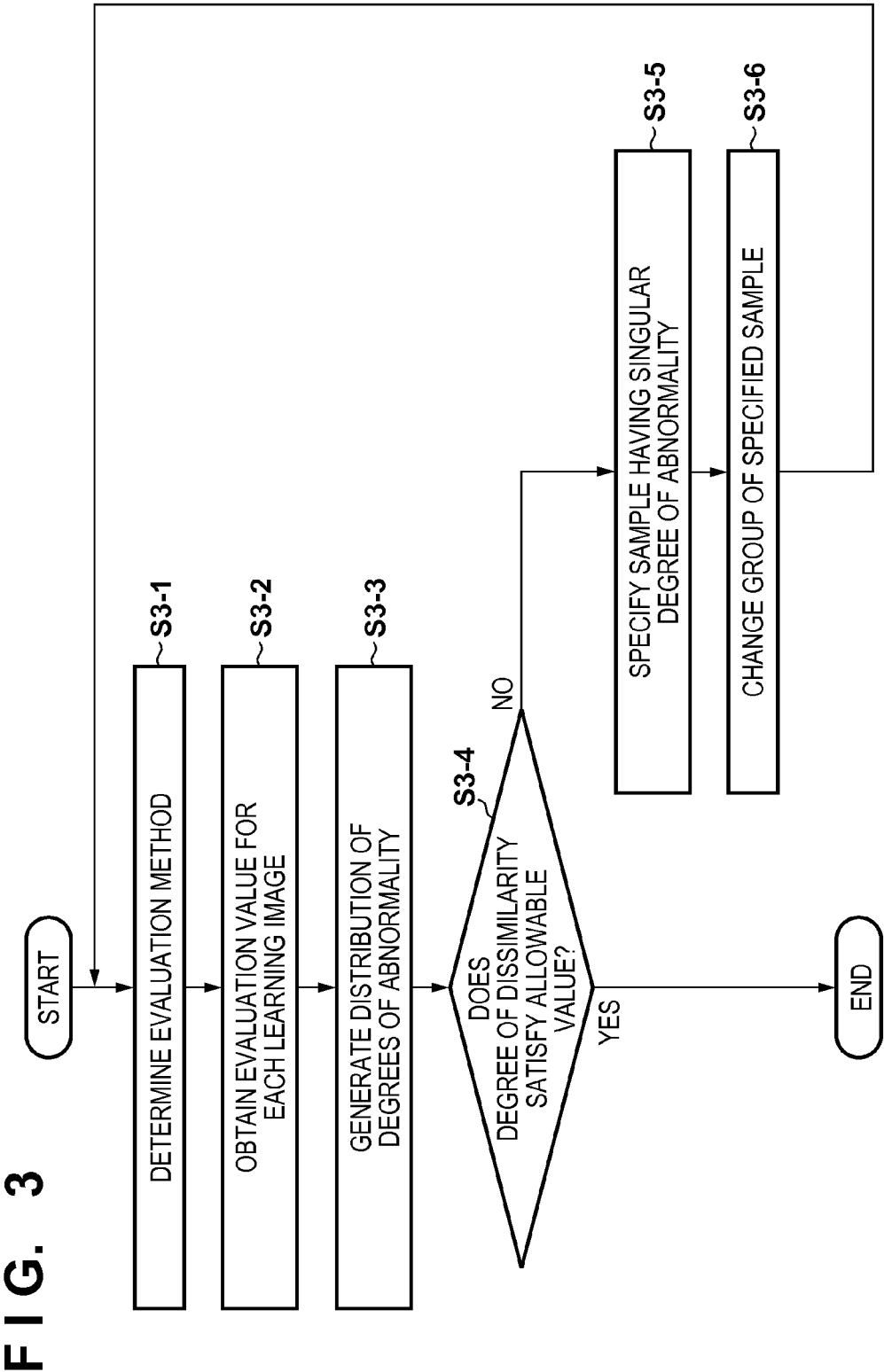

FIG. 4

| | FEATURE AMOUNT 1 | FEATURE AMOUNT 2 | ... | FEATURE AMOUNT k |
|---|---|---|---|---|
| LEARNING IMAGE 1 | $x_{11}$ | $x_{12}$ | ... | $x_{1K}$ |
| LEARNING IMAGE 2 | $x_{21}$ | $x_{22}$ | ... | $x_{2K}$ |
| ... | ... | ... | ... | ... |
| LEARNING IMAGE n | $x_{n1}$ | $x_{n2}$ | ... | $x_{nK}$ |
| AVERAGE M OF FEATURE AMOUNTS | $M_1$ | $M_2$ | ... | $M_K$ |
| STANDARD DEVIATION σ OF FEATURE AMOUNTS | $\sigma_1$ | $\sigma_2$ | ... | $\sigma_K$ |

CLASSIFYING METHOD, STORAGE MEDIUM, INSPECTION METHOD, AND INSPECTION APPARATUS

BACKGROUND OF THE INVENTION

Field of the Invention

The present invention relates to a classifying method of classifying an article into one of a plurality of groups, a storage medium, an inspection method, and an inspection apparatus.

Description of the Related Art

As an apparatus for performing visual inspection or internal inspection of an article, there is provided an inspection apparatus for performing inspection using an image (target image) obtained by capturing the article by an image capturing unit. The inspection apparatus performs so-called "learning" of determining an evaluation method for obtaining the evaluation value of an image, by using the images (learning images) of a plurality of samples each of which has already been classified into one of a plurality of groups. An evaluation value for the image of the article is obtained based on the determined evaluation method, and the article is classified into one of the plurality of groups based on the obtained evaluation value. Therefore, the inspection apparatus may determine an evaluation method by learning so as to improve the performance of classifying an article.

Patent literature 1 (Japanese Patent Laid-Open No. 2010-102690) proposes a method of determining a combination of feature amounts to be used by an evaluation method by using a plurality of learning images. Furthermore, patent literature 2 (Japanese Patent Laid-Open No. 2010-157154) proposes a method in which a sample that has been classified into different categories by an apparatus and a user is specified, and the user is prompted to change an evaluation method so that the sample is classified into the same category by the apparatus and the user.

In the method described in patent literature 1, for example, if a plurality of learning images include an image with a small defect, a low-contrast defect, or the like, an evaluation method may not be determined so as to classify a sample associated with the image into a group into which the sample should be originally classified. In this case, patent literature 1 does not describe a technique of changing the evaluation method so as to improve the performance of classifying an article. In the method described in patent literature 2, since a sample which has been classified into different categories by the apparatus and the user is specified, it is necessary to make the apparatus classify all samples every time the evaluation method is changed. This may complicate a process (learning process) of determining an evaluation method to be used to classify an article.

SUMMARY OF THE INVENTION

The present invention provides, for example, a technique advantageous in reducing complication of a learning process and improving the performance of classifying an article.

According to one aspect of the present invention, there is provided a classifying method of classifying an article into one of a plurality of groups based on an image of the article, comprising: determining an evaluation method for obtaining an evaluation value of an image by using at least some of sample images, the sample images indicating images of a plurality of samples each of which has already been classified into one of the plurality of groups; obtaining evaluation values for the sample images by the determined evaluation method; changing a group to which a sample of at least one sample image having a singular evaluation value among the sample images belongs; changing the evaluation method using the sample images after changing the group to which the sample of the at least one sample image belongs; and obtaining an evaluation value for the image of the article using the changed evaluation method, and classifying the article into one of the plurality of groups based on the evaluation value for the image of the article.

Further features of the present invention will become apparent from the following description of exemplary embodiments with reference to the attached drawings.

BRIEF DESCRIPTION OF THE DRAWINGS

FIG. 1 is a schematic view showing an inspection apparatus according to the first embodiment;

FIG. 2 is a flowchart illustrating a classifying method in a processing unit;

FIG. 3 is a flowchart illustrating a method (learning method) of obtaining classifying information;

FIG. 4 is a table showing a result of extracting the feature amount of each image feature included in a feature list with respect to each of a plurality of learning images;

DESCRIPTION OF THE EMBODIMENTS

Figure 5:
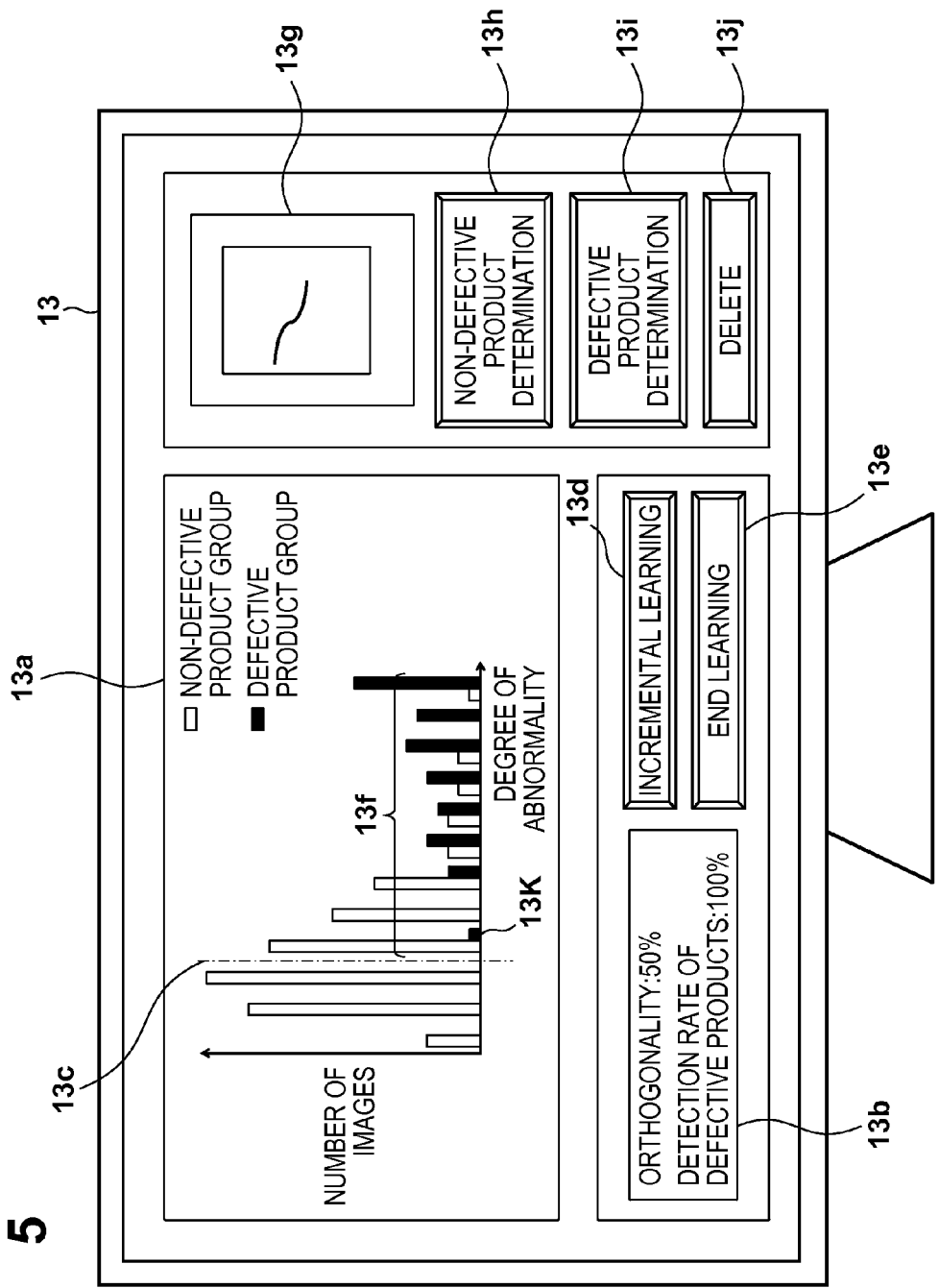
FIG. 5 is a view showing a display example on the screen of a display unit.

Exemplary embodiments of the present invention will be described below with reference to the accompanying drawings. Note that the same reference numerals denote the same members throughout the drawings, and a repetitive description thereof will not be given.

First Embodiment

An inspection apparatus 1 according to the first embodiment of the present invention will be described with reference to FIG. 1. FIG. 1 is a schematic view showing the inspection apparatus 1 according to the first embodiment. For example, the inspection apparatus 1 performs visual inspection of an article 2 such as a metal part or resin part used in an industrial product. A defect such as a scratch, unevenness (for example, color unevenness), or roughness may have occurred on the surface of the article 2. The inspection apparatus 1 detects the defect occurring on the surface of the article 2 based on an image of the article 2, and classifies the article 2 into one of a plurality of groups. The first embodiment will describe an example in which the plurality of groups include a non-defective product group (first group) and a defective product group (second group), and the inspection apparatus 1 classifies the article 2 into one of the non-defective product group and the defective product group. Although the first embodiment will describe an example in which the inspection apparatus 1 inspects the outer appearance of the article 2 (the surface of the article 2), this embodiment is applicable to a case in which the interior of the article 2 is inspected using X-rays or the like.

The inspection apparatus 1 can include an image capturing unit 11, a processing unit 12, a display unit 13, and an input unit 14. The image capturing unit 11 includes, for example, an illumination unit and a camera, and obtains an image (target image) of the article 2 by capturing the article 2. The image of the article 2 obtained by the image capturing unit 11 is transferred to the processing unit 12. The processing unit 12 can be implemented by an information processing apparatus including a CPU 12a (Central Processing Unit), a RAM 12b (Random Access Memory), and an HDD 12c (Hard Disk Drive). The processing unit 12 executes a process (classifying process) of obtaining an evaluation value for the target image obtained by the image capturing unit 11, and classifying the article 2 into one of the plurality of groups based on the obtained evaluation value and an evaluation value range (threshold) in each group. The CPU 12a executes a program for classifying the article 2 into one of the plurality of groups, and the RAM 12b and HDD 12c store the program and data. The display unit 13 includes, for example, a monitor, and displays the result of the classifying process executed by the processing unit 12. The input unit 14 includes, for example, a keyboard and a mouse, and transmits an instruction from the user to the processing unit 12.

[Classifying Process in Processing Unit 12]

The classifying process in the processing unit 12 will be described next with reference to FIG. 2. FIG. 2 is a flowchart illustrating the method of the classifying process in the processing unit 12. In step S1, the processing unit 12 sets conditions of the image capturing unit 11 when capturing the article 2 so as to obtain an image in which a defect on the surface of the article 2 is visualized. The conditions can include, for example, the angle of illumination, and the exposure time, focus, and aperture of the camera. In step S2, the processing unit 12 obtains images (learning images, sample images) of a plurality of samples each of which has already been classified into one of the plurality of groups. The plurality of learning images may be images captured and saved by the image capturing unit 11 previously. If there are no saved images, images may be newly obtained by causing the image capturing unit 11 to capture the plurality of samples. Each of the plurality of samples has been classified into one of the plurality of groups (non-defective product group and defective product group) based on its learning image by, for example, the user. In the first embodiment, the images of the samples classified into one of the two groups (non-defective product group and defective product group) are used as learning images. However, the present invention is not limited to this. For example, an image of the sample more finely classified in accordance with the type (a scratch, unevenness, or the like) of a defective product may be used as a learning image.

In step S3, the processing unit 12 performs so-called "learning" of obtaining information (to be referred to as classifying information hereinafter) for classifying a target image using at least some of the plurality of learning images obtained in step S2. The classifying information can include an evaluation method for obtaining an evaluation value of the image and a threshold of the evaluation value for classifying the article. The evaluation method is, for example, a function for obtaining the evaluation value of the image, and can obtain the evaluation value of the image by substituting a plurality of feature amounts in the image into the evaluation method that uses the plurality of feature amounts as parameters. The feature amount indicates the magnitude of a feature (to be referred to as an image feature hereinafter) in the image. In step S3, the processing unit 12 creates a feature list by automatically extracting, from a number of image features, a plurality of image features estimated to have been used to classify each learning image into one of the non-defective product group and the defective product group. An evaluation method that uses, as parameters, the feature amounts of the plurality of image features included in the feature list is determined as a part of classifying information. A method of obtaining classifying information will be described in detail later. In step S4, the processing unit 12 causes the image capturing unit 11 to capture the article 2, and classifies an obtained image (target image) of the article 2 into one of the non-defective product group and the defective product group based on the classifying information obtained in step S3. For example, the processing unit 12 obtains the evaluation value of the target image using the evaluation method determined in step S3, and compares the evaluation value with the threshold to determine a group into which the article is classified. In step S5, the processing unit 12 displays an inspection result on the display unit 13. In addition to determination of a non-defective product or defective product for the article 2, the processing unit 12 may display, on the display unit 13, an image of a defective portion occurring in the article 2, the feature amount of each image feature included in the feature list, the evaluation value, and the like as an inspection result.

[Obtaining of Classifying Information]

Obtaining (learning) classifying information in the process in step S3 of the flowchart shown in FIG. 2 will be described with reference to FIG. 3. FIG. 3 is a flowchart illustrating the method (learning method) of obtaining classifying information.

In step S3-1, the processing unit 12 creates a feature list using at least some of a plurality of learning images, and determines an evaluation method that uses, as parameters, the feature amounts of a plurality of image features included in the feature list. An example in which n learning images are used to create a feature list and a Mahalanobis distance is used as an evaluation method will be explained below. For example, to emphasize a defect in each of the plurality of learning images, the processing unit 12 performs, for each learning image, Haar-wavelet transformation which is one of wavelet transformations as transformation methods into a frequency domain. The Haar-wavelet transformation is a process capable of performing frequency transformation while holding position information. The processing unit 12 performs an inner product calculation for each of the plurality of learning images using four types of filters of the first to fourth filters given by equations (1). In equations (1), the first filter is a filter for extracting high-frequency components in the vertical direction, the second filter is a filter for extracting high-frequency components in the diagonal direction, the third filter is a filter for extracting high-frequency components in the horizontal direction, and the fourth filter is a filter for extracting low-frequency components.

$$\text{first filter} = \begin{pmatrix} 1 & 1 \\ -1 & -1 \end{pmatrix}, \text{second filter} = \begin{pmatrix} 1 & -1 \\ -1 & 1 \end{pmatrix} \quad (1)$$

$$\text{third filter} = \begin{pmatrix} 1 & -1 \\ 1 & -1 \end{pmatrix}, \text{fourth filter} = \frac{1}{4}\begin{pmatrix} 1 & 1 \\ 1 & 1 \end{pmatrix}$$

This allows the processing unit 12 to obtain four kinds of images: an image in which high-frequency components in the vertical direction are extracted, an image in which high-frequency components in the diagonal direction are extracted, an image in which high-frequency components in the horizontal direction are extracted, and an image in which low-frequency components are extracted. Each of the thus obtained four kinds of images has a ½ resolution, as compared with the image before transformation. The processing unit 12 repeats the process of performing the Haar-wavelet transformation for the image in which the low-frequency components are extracted, and obtaining four kinds of images having a ½ resolution, thereby obtaining a plurality of images with hierarchically decreasing frequencies.

The processing unit 12 extracts global image features such as the maximum value, average value, variance value, kurtosis, skewness, geometric mean, and the like of all pixel values from each of an image in each layer obtained by the Haar-wavelet transformation and an image before the transformation. The processing unit 12 may extract statistic values such as the contrast, the difference between the maximum value and the minimum value, and the standard deviation as global image features. With this process, the processing unit 12 can extract a number of image features from the plurality of learning images. In this embodiment, a number of image features are obtained using the Haar-wavelet transformation. However, for example, a number of image features may be obtained using another transformation method such as another wavelet transformation, edge extraction, Fourier transformation, or Gabor transformation. A number of image features may include local image features calculated by a filtering process in addition to the global image features.

The processing unit 12 calculates a score for each of the extracted image features using learning images in the non-defective product group, and selects image features to be used for a classifying process from a number of extracted image features, thereby creating a feature list. As a method of selecting image features, for example, there is provided a method of evaluating the compatibility of a combination of image features using the learning images in the non-defective product group, as described in patent literature 1. In this embodiment, image features to be used for a classifying process are selected using the method. However, for example, another method such as a principal component analysis method may be used. The principal component analysis method is a method of selecting image features with high eigenvalues by eigenvalue decomposition to avoid redundancy in the plurality of image features. Using this method can prevent redundant image features from being selected. Although an example of selecting image features using the learning images in the non-defective product group has been explained above, the present invention is not limited to this. For example, image features may be selected using learning images in the defective product group or using the learning images in both of the groups.

A method of determining the weight of the feature amount of each image feature included in the created feature list will be described with reference to FIG. 4. FIG. 4 is a table showing a result of extracting the feature amount of each image feature included in the feature list with respect to each of the plurality of learning images. Referring to FIG. 4, each feature amount in each of the plurality of learning images is represented by $X_{ij}$ where i represents an ID number of a learning image (i=1, 2, . . . n) and j represents an ID number of a feature included in the feature list (j=1, 2, . . . k). Note that n represents the number of learning images and k represents the number of image features included in the feature list. The relationship between n and k can satisfy n≥k. Note also that $M_j$ indicates the average value of the feature amounts $X_{ij}$ in the plurality of learning images, and $\sigma_j$ indicates the standard deviation of the feature amounts $X_{ij}$ in the plurality of learning images.

The processing unit 12 normalizes each feature amount $X_{ij}$ in each of the plurality of learning images by equation (2). In equation (2), $Y_{ij}$ represents each normalized feature amount. The processing unit 12 obtains a correlation coefficient $r_{pq}$ by equation (3), and obtains an inverse matrix A of a correlation matrix R formed by respective correlation coefficients $r_{11}$ to $r_{kk}$, as given by equation (4). The inverse matrix A corresponds to the weight of the feature amount of each image feature included in the feature list. This enables the processing unit 12 to determine, as an evaluation method, a Mahalanobis distance $MD_i$ represented by equation (5) that uses, as parameters, the feature amounts (normalized feature amounts) of the respective image features included in the feature list.

$$Y_{ij} = \frac{X_{ij} M_j}{\sigma_j} \quad (2)$$

$$r_{pq} = \frac{1}{n} \sum_{i=1}^{n} Y_{ip} Y_{iq} \quad (3)$$

$$A = \begin{pmatrix} r_{11} & r_{12} & \cdots & r_{1k} \\ r_{21} & r_{22} & \cdots & r_{2k} \\ \vdots & \vdots & \ddots & \vdots \\ r_{k1} & r_{k2} & \cdots & r_{kk} \end{pmatrix}^{-1} \quad (4)$$

$$MD_i = \sqrt{\frac{1}{k} \left( (Y_{i1} \; Y_{i2} \; \cdots \; Y_{ik}) A \begin{pmatrix} Y_{i1} \\ Y_{i2} \\ \vdots \\ Y_{ik} \end{pmatrix} \right)} \quad (5)$$

Referring back to the flowchart shown in FIG. 3, in step S3-2, the processing unit 12 obtains an evaluation value for each of the plurality of learning images by using the evaluation method (Mahalanobis distance $MD_i$) determined in step S3-1. The processing unit 12 extracts a plurality of feature amounts from each of the plurality of learning images according to the feature list, and substitutes the plurality of feature amounts into the evaluation method, thereby obtaining an evaluation value for each learning image. In the first embodiment, an example in which a degree of abnormality is used as the evaluation value of each learning image will be described. Although the degree of abnormality (evaluation value) is obtained by the Mahalanobis distance $MD_i$ in this embodiment, it may be obtained by a Euclidean distance or a projection distance as a kind of subspace method.

In step S3-3, the processing unit 12 generates the distribution of degrees of abnormality (evaluation values) of the plurality of learning images for each group, and displays it on the display unit 13. In step S3-4, the processing unit 12 determines whether a degree of dissimilarity in the range (the evaluation value range) of an evaluation value for the image of a sample between the plurality of groups satisfies an allowable value. If the degree of dissimilarity does not satisfy the allowable value, the process advances to step S3-5; otherwise, obtaining (learning) classifying information ends. For example, the allowable value can be preset by the user.

FIG. 5 is a view showing a display example on the screen of the display unit 13. In a region 13a of the display unit 13, the distribution (histogram) of the degrees of abnormality (evaluation values) of the respective learning images is displayed with respect to each group. In the histogram, a white bar represents the number of learning images in the non-defective product group, and a black bar represents the number of learning images in the defective product group. In a region 13b of the display unit 13, a detection rate of defective products for determining the threshold of an evaluation value for classifying the target image and an orthogonality as the degree of dissimilarity are displayed.

The detection rate of defective products indicates a rate at which samples that should be classified into a predetermined group of the plurality of groups are classified into the predetermined group, and indicates, for example, a rate at which defective products are classified as defective products. The threshold can be determined in accordance with the detection rate of defective products. The detection rate of defective products can be arbitrarily set by the user but is generally set to 100% so as not to classify a defective product as a non-defective product. If the detection rate of defective products is 100%, the processing unit 12 sets the threshold to a value smaller than the minimum value of the degrees of abnormality of the learning images in the defective product group. That is, the processing unit 12 sets the threshold so that all the learning images in the defective product group are arranged on the right side of the threshold in the histogram shown in FIG. 5. In the example shown in FIG. 5, the processing unit 12 sets a threshold 13c to be smaller than the degree of abnormality of a learning image 13k, which is smallest in the defective product group.

The orthogonality as the degree of dissimilarity indicates the ratio of learning images each having the degree of abnormality smaller than the threshold to all the learning images in the non-defective product group. In general, the orthogonality may be high. When the orthogonality is 100%, an ideal state is obtained in which all the learning images in the non-defective product group are arranged on the left side of the threshold and all the learning images in the defective product group are arranged on the right side of the threshold.

Although the process of determining whether the degree of dissimilarity satisfies the allowable value is performed by the processing unit 12 in this embodiment, it may be performed by, for example, the user. In this case, if the user determines that the degree of dissimilarity (orthogonality) does not satisfy the allowable value, he/she presses an "incremental learning" button 13d via the input unit 14; otherwise, he/she presses an "end learning" button 13e via the input unit 14. If the user presses the "incremental learning" button 13d, the processing unit 12 advances to step S3-5. If the user presses the "end learning" button 13e, the processing unit 12 ends obtaining (learning) classifying information.

In step S3-5, the processing unit 12 specifies at least one sample having a singular degree of abnormality among the degrees of abnormality of the plurality of learning images based on information that represents, for each group, the degrees of abnormality (evaluation values) of the plurality of learning images. In the first embodiment, as the information, a histogram of the degrees of abnormality in each group is used. The processing unit 12 may select at least one sample having a singular evaluation value from samples belonging to a portion (to be referred to as an overlapping portion hereinafter) where the range of an evaluation value for the image of a sample of the non-defective product group overlaps that of the defective product group. The overlapping portion indicates, for example, a range 13f of the degree of abnormality in the histogram displayed in the region 13a of the display unit 13. For example, the processing unit 12 specifies at least one sample in ascending order of the degree of abnormality among the samples included in the defective product group and the overlapping portion. Alternatively, the processing unit 12 specifies at least one sample in descending order of the degree of abnormality among the samples included in the non-defective product group and the overlapping portion. For example, the number of samples to be specified can be preset by the user. The processing unit 12 may display the learning image of the specified sample in a region 13g of the display unit 13. Although at least one sample having a singular evaluation value is specified by the processing unit 12 in this embodiment, this operation may be performed by, for example, the user. In this case, the user can specify at least one sample by selecting a learning image having a singular evaluation value via the input unit 14 in the histogram displayed in the region 13a of the display unit 13.

In step S3-6, the processing unit 12 changes the group to which at least one sample specified in step S3-5 belongs. For example, if at least one sample specified in step S3-5 belongs to the defective product group, the processing unit 12 changes the group, to which at least one sample belongs, from the defective product group to the non-defective product group. In the example shown in FIG. 5, if a sample associated with the learning image 13k having the lowest degree of abnormality in the defective product group is specified in step S3-5, the processing unit 12 changes, to the non-defective product group, the group to which the sample associated with the learning image 13k belongs.

The processing unit 12 may be configured to display the learning image of a specified article in the region 13g of the display unit 13, and prompt the user to determine whether to change the group to which the learning image belongs. In this case, the processing unit 12 prompts the user to determine, by referring to the learning image displayed in the region 13g of the display unit 13, whether to determine a sample associated with the learning image as a non-defective product or defective product, or to delete the learning image. For example, when the sample specified in step S3-5 belongs to the defective product group, if the user presses a "non-defective product determination" button 13h via the input unit 14, the processing unit 12 changes, to the non-defective product group, the group to which the specified sample belongs. On the other hand, if the user presses a "defective product determination" button 13i, the processing unit 12 ends learning. Alternatively, if the user presses a "delete" button 13j, the processing unit 12 deletes the learning image of the specified sample.

In step S3-1 after the process in step S3-6, the processing unit 12 newly creates a feature list using the learning images of a plurality of samples after the group to which at least one sample belongs is changed in step S3-6, and changes the evaluation method. In step S3-2 after the process in step S3-6, the processing unit 12 obtains an evaluation value for each of the plurality of learning images using the changed evaluation method. In step S3-3 after the process in step S3-6, the processing unit 12 newly generates the distribution of the degrees of abnormality (evaluation values) of the respective learning images with respect to each group. In step S3-4 after the process in step S3-6, the processing unit 12 determines whether the degree of dissimilarity satisfies the allowable value, and also newly determines a threshold according to the detection rate of defective products. In the first embodiment, the processing unit 12 returns to step S3-1 after the process in step S3-6, and newly creates a feature list and changes the evaluation method. However, the present invention is not limited to this. For example, the processing unit 12 may return to step S3-3 after the process in step S3-5, and newly determine only a threshold according to the detection rate of defective products without changing the evaluation method in step S3-1 or generating the distribution of the degrees of abnormality of the respective learning images in step S3-3. In this case, the processing unit 12 obtains the evaluation value of the target image using the evaluation method determined in the process of step S3-1, determines, in accordance with the threshold newly determined in step S3-3, a group into which the article is classified, and classifies the article into one of the plurality of groups.

As described above, the inspection apparatus 1 according to the first embodiment obtains an evaluation value for each of the plurality of learning images using the evaluation method. The inspection apparatus 1 changes the group of at least one sample having a singular evaluation value among the evaluation values of the plurality of learning images, and newly creates a feature list, thereby changing the evaluation method. This allows the inspection apparatus 1 to perform high-accuracy learning, and accurately classify the article into one of the plurality of groups by obtaining an evaluation value for the target image using the changed evaluation method.

Second Embodiment

In the first embodiment, when specifying at least one sample having a singular degree of abnormality, explanation was given of an example in which a histogram of the degree of abnormality in each group was used as information that represented, for each group, the degree of abnormality for each of a plurality of leaning images. In the second embodiment, explanation is given of an example that uses, as the information, a relationship between each learning image of the non-defective product group sorted by the degrees of abnormality (evaluation values), and a number of learning images of the defective product group having degrees of abnormality corresponding to the degree of abnormality of each learning image of the non-defective product group. Below, the relationship is referred to as an "accumulated number distribution".

Figure 6:
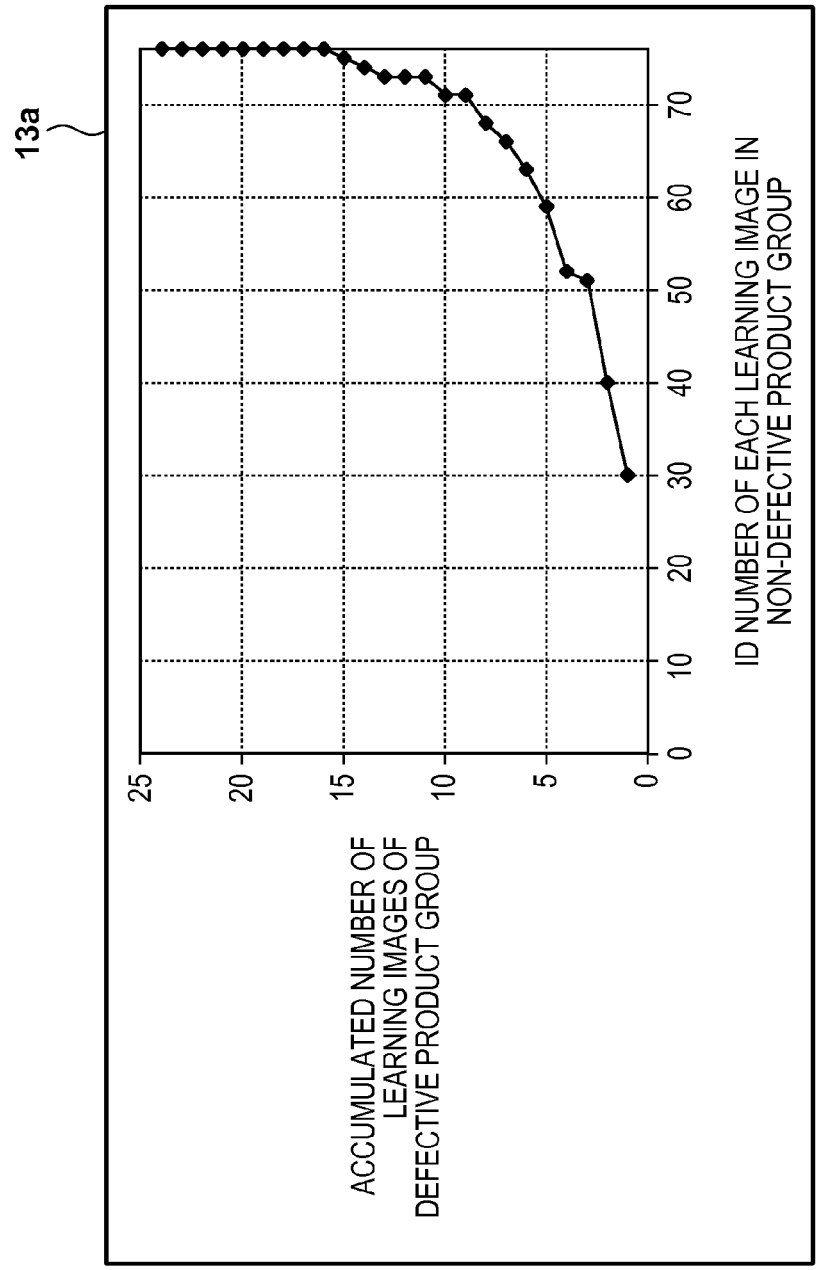
FIG. 6 is a view illustrating an accumulated number distribution that is displayed on the display unit.

FIG. 6 is a view illustrating an accumulated number distribution. The accumulated number distribution can be generated by the processing unit 12 in step S3-3, and displayed in the region 13a of the display unit 13. The abscissa in FIG. 6 illustrates the ID number of each learning image of the non-defective product group, caused to be sorted in ascending order of the degree of abnormality, and the ordinate displays a number (accumulated number) of learning images of the defective product group having a degree of abnormality corresponding to the degree of abnormality of each learning image of the non-defective product group.

For example, in FIG. 6, where the ID number of the learning image of the non-defective product group (abscissa) is "30", the accumulated number of learning images of the defective product group (ordinate) is incremented to one. This illustrates that there is one learning image of the defective group having a degree of abnormality corresponding to the degree of abnormality of the 30th learning image of the non-defective product group. Specifically, it is illustrated that the degree of abnormality of one learning image in the defective product group is between the degree of abnormality of the 30th learning image and the degree of abnormality of the 31st learning image in the non-defective product group.

Similarly, in FIG. 6, where the ID number of the learning image of the non-defective product group (abscissa) is "40", the accumulated number of learning images of the defective product group (ordinate) is incremented to two. This illustrates that there is one learning image of the defective group having a degree of abnormality corresponding to the degree of abnormality of the 40th learning image of the non-defective product group. Specifically, it is illustrated that the degree of abnormality of one learning image in the defective product group is between the degree of abnormality of the 40th learning image and the degree of abnormality of the 41st learning image in the non-defective product group.

Next, explanation is given regarding merits of using the accumulated number distribution illustrated in FIG. 6. There are mainly three merits to using the accumulated number distribution. The first merit is that the graph shape is determined uniquely. For example, if a histogram is used as information that represents the degree of abnormality for each group, it is not possible to determine the graph shape without setting a bin. However, if the accumulated number distributed illustrated in FIG. 6 is used as the information, it is possible to uniquely determine the graph shape without setting a bin or the like.

The second merit is that it is possible to easily detect a learning image of the defective group for which the degree of abnormality is smallest. Commonly, in an inspection system, how fast and accurately it is possible to identify a defective product closest to a non-defective product is a large problem in classifying images at high precision. If using a histogram, it is not possible to detect a learning image of a defective product group for which the degree of abnormality is lowest, without referring to two histograms of the non-defective product group and the defective product group. However, in the accumulated number distribution illustrated in FIG. 6, by referring to only one piece of data expressed by a plot line, it is possible to easily and accurately detect the learning image of the defective product group for which the degree of abnormality is lowest.

Figure 7:
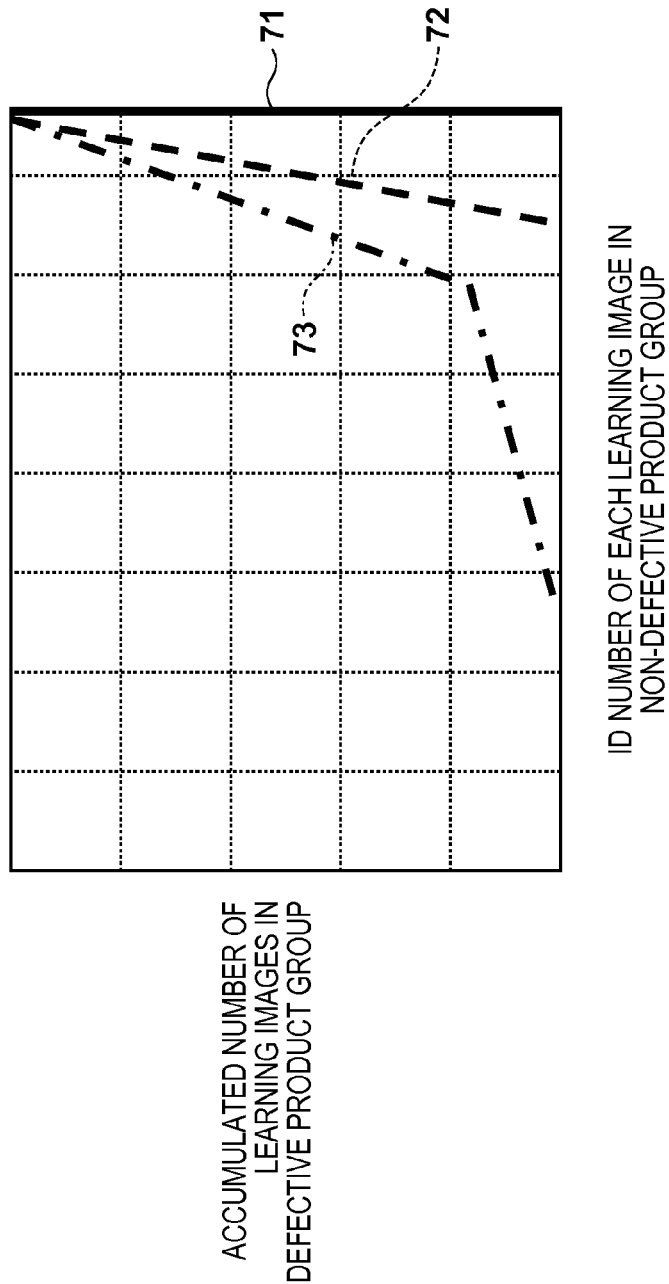
FIG. 7 is a view illustrating a comparative example of an accumulated number distribution.

The third merit is that it is possible to easily determine whether a learning result according to a graph shape is valid. In other words, in an accumulated number distribution, it is possible to easily grasp an orthogonality (degree of dissimilarity) from the graph shape (inclination of the plot line). FIG. 7 illustrates comparative examples (three examples) for the accumulated number distribution. A solid line 71 in FIG. 7 illustrates a case in which the degree of abnormality of all learning images in the defective product group is larger than the maximum degree of abnormality of the learning images in the non-defective product group and the non-defective product group and the defective product group are completely separated. In addition, a broken line 72 in FIG. 7 illustrates a case in which, while there are learning images having a degree of abnormality smaller than the maximum degree of abnormality in the non-defective product group among learning images in the defective group, the non-defective product group and the defective product group are sufficiently separated. Furthermore, a dot-dash line 73 in FIG. 7 illustrates a case in which, among learning images in the defective product group, there are learning images for which the degree of abnormality is particularly lower than the maximum degree of abnormality in the non-defective product group, and the learning is insufficient. As reasons why a graph shape such as illustrated by the dot-dash line 73 is formed, for example, a learning image that should have been originally classified in the non-defective product group is classified into the defective product group, necessary image features to classify the non-defective product group are not extracted, or the like may be given.

Figure 8:
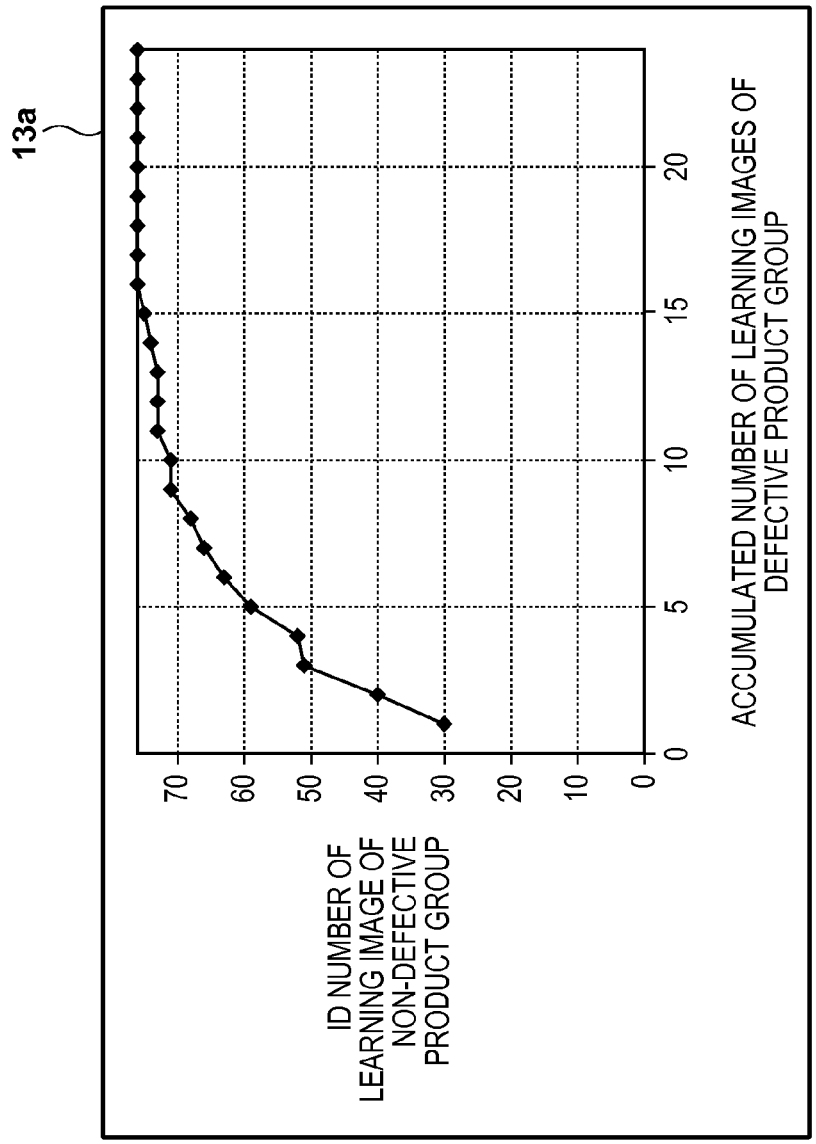
FIG. 8 is a view illustrating a variation of an accumulated number distribution.

Here, in the accumulated number distribution, the orthogonality (degree of dissimilarity) is obtained from the graph shape (inclination of the plot line), and whether the obtained orthogonality satisfies an allowable value is determined in step S3-4. In addition, the accumulated number distribution is not limited to the example illustrated in FIG. 6, and, for example, and the abscissa and ordinate may be reversed from that of FIG. 6, as illustrated in FIG. 8.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242305 filed on Nov. 28, 2014, and Japanese Patent Application No. 2015-199722 filed on Oct. 7, 2015, which are hereby incorporated by reference herein in their entirety.

What is claimed is:

1. A classifying method of classifying an article into one of a plurality of groups based on an evaluation value for an image of the article, the method comprising:
    a determining step of determining an evaluation method for obtaining the evaluation value based on sample images, which are images of a plurality of samples each of which has already been classified into one of the plurality of groups;
    a first obtaining step of obtaining evaluation values for the sample images by the determined evaluation method;
    a first changing step of changing a group for a sample with a sample image having a singular evaluation value for the group;
    a second changing step of changing the evaluation method based on the sample images, each of which is being classified into one of the plurality of groups after changing the group; and
    a second obtaining step of obtaining the evaluation value for the image of the article using the changed evaluation method, and classifying the article into one of the plurality of groups based on the obtained evaluation value for the image of the article.

2. The method according to claim 1, wherein the first changing step and the second changing step are repeated so that a degree of dissimilarity in an evaluation value range for sample images between the plurality of groups satisfies an allowable value.

3. The method according to claim 1, wherein:
    the plurality of groups include a first group and a second group, and
    the sample image is selected from sample images where an evaluation value range for sample images of the first group overlaps an evaluation value range for sample images of the second group.

4. The method according to claim 1, wherein the first obtaining step obtains, based on a plurality of feature amounts extracted, as parameters to be used by the evaluation method, from each of the sample images, an evaluation value for each of the sample images by substituting the plurality of feature amounts into the evaluation method.

5. The method according to claim 1, wherein the second changing step:
    obtains new evaluation values for the sample images after changing the group; and
    determines a threshold of the evaluation value to be used to classify the article based on the obtained new evaluation values for the sample images.

6. The method according to claim 5, wherein the second changing step determines the threshold in accordance with a target rate at which samples that should be classified into a predetermined group among the plurality of groups are classified into the predetermined group.

7. The method according to claim 1, wherein the first changing step displays information that represents, for each group, an evaluation value for each of the sample images.

8. The method according to claim 7, wherein the information comprises a histogram of the evaluation values in each group.

9. The method according to claim 7, wherein:
    the plurality of groups comprises a first group and a second group, and
    the information comprises a relation between sample images of the first group sorted by the evaluation values and a number of sample images in the second group having an evaluation value corresponding to an evaluation value of the sample images of the first group.

10. The method according to claim 7, wherein the first changing step specifies the sample of the sample image based on the information displayed in the displaying.

11. The method according to claim 1, wherein the plurality of groups includes a non-defective product group and a defective product group.

12. A non-transitory computer-readable storage medium storing a program for causing a computer to execute each step of a classifying method of classifying an article into one of a plurality of groups based on an evaluation value for an image of the article, the method comprising the steps of:
    determining an evaluation method for obtaining the evaluation value based on sample images, which are images of a plurality of samples, each of which has already been classified into one of the plurality of groups;
    obtaining evaluation values for the sample images by the determined evaluation method;

changing a group for a sample with a sample image having a singular evaluation value for the group;

changing the evaluation method based on the sample images, each of which is being classified into one of the plurality of groups after changing the group; and obtaining the evaluation value for the image of the article using the changed evaluation method, and classifying the article into one of the plurality of groups based on the obtained evaluation value for the image of the article.

13. An inspection method of performing inspection of an article, comprising:

obtaining an image of the article by capturing the article; and classifying the article into one of a plurality of groups using a classifying method, wherein the classifying method is a method of classifying the article into one of the plurality of groups based on an evaluation value for the image of the article, and includes the steps of:

determining an evaluation method for obtaining the evaluation value based on sample images, which are images of a plurality of samples, each of which has already been classified into one of the plurality of groups;

obtaining evaluation values for the sample images by the determined evaluation method;

changing a group for a sample with a sample image having a singular evaluation value for the group;

changing the evaluation method based on the sample images, each of which is being classified into one of the plurality of groups after changing the group; and obtaining the evaluation value for the image of the article using the changed evaluation method, and classifying the article into one of the plurality of groups based on the obtained evaluation value for the image of the article.

14. An inspection apparatus for performing inspection of an article, the apparatus comprising:

a camera configured to obtain an image of the article by capturing the article; and a processor configured to classify the article into one of a plurality of groups based on an evaluation value for the image of the article, wherein the processor is further configured to:

determine an evaluation method for obtaining the evaluation value based on sample images, which are images of a plurality of samples, each of which has already been classified into one of the plurality of groups;

obtain evaluation values for the sample images by the determined evaluation method;

change a group for a sample with a sample image having a singular evaluation value for the group;

change the evaluation method based on the sample images, each of which is being classified into one of the plurality of groups after changing the group; and obtain the evaluation value for the image of the article using the changed evaluation method, and classifies the article into one of the plurality of groups based on the obtained evaluation value for the image of the article.

15. A changing method of changing an evaluation method of obtaining an evaluation value for an image of an article to classify the article into one of a plurality of groups, the method comprising:

a determining step of determining the evaluation method of obtaining the evaluation value based on sample images, which are images of a plurality of samples each of which has already been classified into one of the plurality of groups;

an obtaining step of obtaining evaluation values for the sample images by the determined evaluation method;

a first changing step of changing a group for a sample with a sample image having a singular evaluation value for the group; and a second changing step of changing the evaluation method based on the sample images, each of which is being classified into one of the plurality of groups after changing the group, wherein an inspection apparatus for performing inspection of the article is configured to obtain the evaluation value for the image of the article using the changed evaluation method, and classify the article into one of the plurality of groups based on the obtained evaluation value for the image of the article.

16. The method of claim 15, wherein the plurality of groups includes a non-defective product group and a defective product group.

17. The method of claim 15, wherein the second changing step:

obtains new evaluation values for the sample images after changing the group; and determines a threshold of the evaluation value to be used to classify the article based on the obtained new evaluation values for the sample images.

18. The method according to claim 15, wherein the first changing step displays information that represents, for each group, an evaluation value for each of the sample images.

19. A non-transitory computer-readable storage medium storing a program for causing a computer to execute each step of a changing method of changing an evaluation method of obtaining an evaluation value for an image of an article to classify the article into one of a plurality of groups, the method comprising the steps of:

determining the evaluation method of obtaining the evaluation value based on sample images, which are images of a plurality of samples, each of which has already been classified into one of the plurality of groups;

obtaining evaluation values for the sample images by the determined evaluation method;

changing a group for a sample with a sample image having a singular evaluation value for the group; and changing the evaluation method based on the sample images, each of which is being classified into one of the plurality of groups after changing the group, wherein an inspection apparatus for performing inspection of the article is configured to obtain the evaluation value for the image of the article using the changed evaluation method, and classify the article into one of the plurality of groups based on the obtained evaluation value for the image of the article.

20. A changing method of changing a group for a sample image, the method comprising:

a determining step of determining an evaluation method for obtaining an evaluation value for an image of an article based on sample images, which are images of a plurality of samples each of which has already been classified into one of a plurality of groups;

an obtaining step of obtaining evaluation values for the sample images by the determined evaluation method; and a changing step of changing a group for a sample with a sample image having a singular evaluation value for the group, wherein the plurality groups includes a first group and a second group, and the sample image is selected from sample images where an evaluation value range for sample images of the first group overlaps an evaluation value range for sample images of the second group, and wherein an inspection apparatus for performing inspection of the article is configured to change the evaluation method based on the sample images, each of which is being classified into one of the plurality of groups after changing the group, obtain the evaluation value for the image of the article using the changed evaluation method, and classify the article into one of the plurality of groups based on the obtained evaluation value for the image of the article.

21. The method according to claim 20, wherein the changing step changes the group by changing the group, to which the sample of the sample image belongs, to another group.

22. The method according to claim 20, wherein the plurality of groups includes a non-defective product group an a defective product group.

23. The method according to claim 20, wherein the changing step displays information that represents, for each group, an evaluation value for each of the sample images.

24. A non-transitory computer-readable storage medium storing a program for causing a computer to execute each step of a changing method of changing a group for a sample image, the method comprising the steps of:

determining an evaluation method for obtaining an evaluation value for an image of an article based on sample images, which are images of a plurality of samples each of which has already been classified into one of a plurality of groups;

obtaining evaluation values for the sample images by the determined evaluation method; and changing a group for a sample with a sample image having a singular evaluation value for the group, wherein the plurality groups includes a first group and a second group, and the sample image is selected from sample images where an evaluation value range for sample images of the first group overlaps an evaluation value range for sample images of the second group, and wherein an inspection apparatus for performing inspection of the article is configured to change the evaluation method based on the sample images, each of which is being classified into one of the plurality of groups after changing the group, obtain the evaluation value for the image of the article using the changed evaluation method, and classify the article into one of the plurality of groups based on the obtained evaluation value for the image of the article.

\* \* \* \* \*